(12) United States Patent
Ronda

(10) Patent No.: US 8,319,185 B2
(45) Date of Patent: Nov. 27, 2012

(54) FAST RADIATION DETECTORS

(75) Inventor: Cornelis R. Ronda, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 736 days.

(21) Appl. No.: 12/521,598

(22) PCT Filed: Dec. 5, 2007

(86) PCT No.: PCT/IB2007/054936
§ 371 (c)(1),
(2), (4) Date: Jun. 29, 2009

(87) PCT Pub. No.: WO2008/084347
PCT Pub. Date: Jul. 17, 2008

(65) Prior Publication Data
US 2010/0314546 A1  Dec. 16, 2010

Related U.S. Application Data

(60) Provisional application No. 60/883,590, filed on Jan. 5, 2007.

(51) Int. Cl.
*G01T 1/20* (2006.01)
(52) U.S. Cl. .................. 250/361 R; 250/367
(58) Field of Classification Search .............. 250/361 R, 250/367
See application file for complete search history.

(56) References Cited

U.S. PATENT DOCUMENTS

| 4,891,520 | A  | * | 1/1990 | Ishibashi et al. ............. 250/367 |
| 5,134,293 | A  |   | 7/1992 | Anderson et al. |
| 5,493,121 | A  | * | 2/1996 | Fitzpatrick ................... 250/369 |
| 5,813,752 | A  |   | 9/1998 | Singer et al. |
| 5,813,753 | A  |   | 9/1998 | Vriens et al. |
| 6,078,052 | A  |   | 6/2000 | DiFilippo |
| 7,138,633 | B1 | * | 11/2006 | Rozsa et al. .................. 250/368 |
| 7,173,247 | B2 | * | 2/2007 | Shah ........................ 250/363.03 |
| 7,626,176 | B2 | * | 12/2009 | Zeitler et al. ............. 250/370.11 |
| 2003/0067265 | A1 |  | 4/2003 | Srivastava et al. |
| 2004/0251416 | A1 |  | 12/2004 | Baldwin et al. |
| 2004/0256974 | A1 |  | 12/2004 | Mueller-Mach et al. |
| 2006/0000977 | A1 | * | 1/2006 | Juestel et al. ............. 250/361 R |
| 2006/0268946 | A1 | * | 11/2006 | Levatter et al. ................... 372/6 |

FOREIGN PATENT DOCUMENTS

| WO | 2006097882 A2 | 9/2006 |
| WO | 2006114716 A2 | 11/2006 |

OTHER PUBLICATIONS

MIT Department of Nuclear Engineering, Scintillation Detectors, Spring 2002, 22.104, 26 pages, stuff.mit.edu/afs/athena/course/22/22.09/ClassHandouts/Scintillation%20S2002.PDF.

(Continued)

*Primary Examiner* — David Porta
*Assistant Examiner* — Mindy Vu

(57) ABSTRACT

A radiation detector (100) includes a scintillator (102), a wavelength shifter (112), and a photodetector (110). The scintillator (102) produces scintillation photons of a first relatively short wavelength, for example in the ultraviolet or deep ultraviolet. The photodetector is sensitive to photons in the visible portion of the spectrum. The wavelength shifter reduces a spectral mismatch between the scintillator (102) and the photodetector (110).

19 Claims, 3 Drawing Sheets

OTHER PUBLICATIONS

Figure 1:
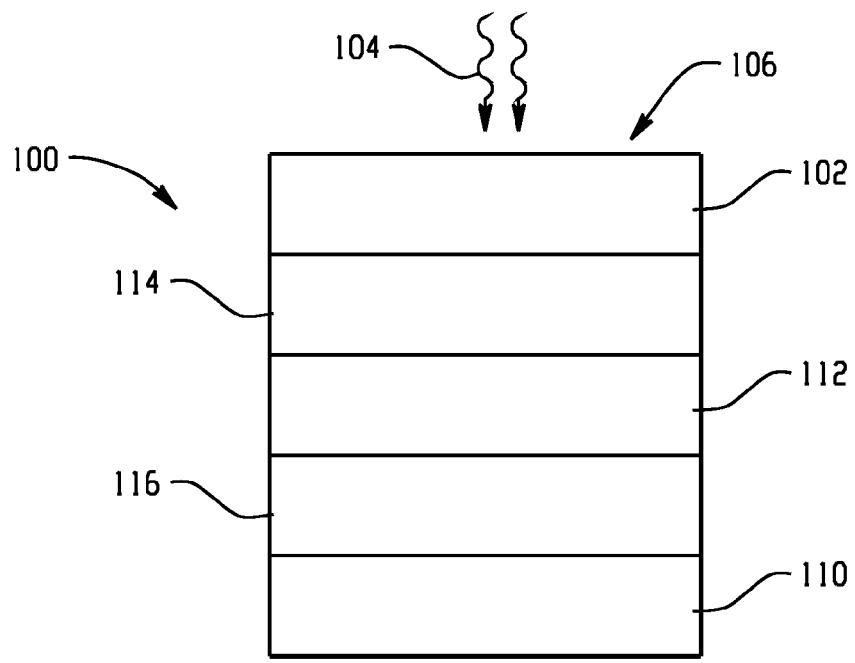

Wojtowicz, et al., Scintillation properties of selected oxide monocrystals activated with Ce and Pr, Optical Materials, Polish-French-Israeli Symposium on Spectroscopy of Modern Materials in Physics, Jan. 2006, pp. 85-93, vol. 28, issue 1-2, abstract attached.

Drozdowski, et al., Scintillation properties of Pr-activated LuAIO3, Optical Materials, Polish-French-Israeli Symposium on Spectroscopy of Modern Materials in Physics, Jan. 2006, pp. 102-105, vol. 28, issue 1-2, abstract attached.

Koch, A., et al.; Powder-phosphor screens combined with interference filters for X-ray imaging with increased brightness; 1999; Nuclear Instruments and Methods in Physics Research; A432:358-363.

* cited by examiner

FAST RADIATION DETECTORS

CROSS REFERENCE TO RELATED APPLICATIONS

This application claims the benefit of U.S. provisional application Ser. No. 60/883,590 filed Jan. 5, 2007, which is incorporated herein by reference.

The present application relates to radiation detectors. It finds particular application in positron emission tomography (PET), single photon emission computed tomography (SPECT), and other systems which benefit from the use of relatively high speed ionizing radiation detectors. It also relates to applications which benefit from an improved spectral matching of the detector components.

Scintillator-based ionizing radiation detectors have included a scintillator in optical communication with a photodetector. In response to radiation received by the detector, the scintillator generates photons having a relatively lower energy. The generated photons are in turn received by the photodetector, which produces an electrical signal indicative of the received radiation.

The performance of a scintillation detector is influenced by various factors, including the characteristics of both the scintillator and the photodetector. For example, it is generally desirable that the scintillator be relatively efficient at converting received radiation of a desired energy to photons. As another example, the speed of the scintillator can in many cases limit the maximum count rate of a detector system and the accuracy of the measurements in a time of flight detector system.

The performance of a scintillation detector is also influenced by the interaction between the scintillator and the photodetector. For example, the scintillator and photodetector used in a given detector system are ordinarily selected so that the photodetector is relatively sensitive to photons of the wavelength(s) emitted by the scintillator. As will be appreciated, however, the relative performance characteristics of the available scintillator materials and photodetectors may be less than optimal for a given application.

One application in which scintillation detectors have gained widespread acceptance is in positron emission computed tomography (PET) systems. In medicine, for example, information from PET scans is used by medical professionals in connection with the diagnosis and treatment of disease. Indeed, PET scanners have made and are expected to continue to make important contributions to the diagnosis and treatment of diseases such as cancer and heart disease and in emerging fields such as molecular imaging and therapeutics.

In a PET system, the detectors are used to detect coincident 511 kiloelectron volt (keV) gamma rays characteristic of positron annihilations resulting from the decay of a radioactive tracer introduced into the anatomy of a patient. PET systems have traditionally used scintillators such as bismuth germanate (B GO) or thallium-activated sodium iodide (NaI: Tl) in optical communication with photodetectors such as photomultiplier tubes (PMTs). Information from the many annihilations detected in the course of a scan has been used to generate images indicative of a pathology of interest.

More recently, relatively faster scintillators such as cerium-activated lutetium oxyorthosilicate (LSO) and lutetium yttrium oxyorthosilicate (LYSO) have become available. These scintillators, which typically have scintillation decay times on the order of 30 to 70 nanoseconds (ns), are used in time of flight PET scanners to measure the differences in arrival times of the coincident 511 keV gammas. This additional time of flight information is in turn used to estimate the location of the various positron annihilations along their respective lines of coincidence. The additional positional information provided by time of flight scanners can be used to produce, for a given imaging time or tracer dose, images having a relatively higher quality.

Nonetheless, there remains room for improvement. In the case of a time of flight PET scanner or in other time of flight detection systems, for example, it is often desirable to improve the accuracy of the time of flight measurements. In count rate sensitive applications, the maximum count rate may in many cases be increased by the use of a relatively faster detector. In still other situations, it may be desirable to improve the interaction between the scintillator and photodetector or otherwise provide additional flexibility in the selection of the scintillator and/or photodetector.

Aspects of the present application address these matters and others.

According to a one aspect, an apparatus includes a scintillator which produces photons in response to received radiation, a wavelength shifter having a first major surface which receives photons from the scintillator. The wavelength shifter produces photons having a relatively longer wavelength than the received photons. The apparatus also includes a wavelength selective interference filter in operative communication with the wavelength shifter and a photodetector in optical communication with a second major surface of the wavelength shifter. The photodetector produces an electrical signal indicative of the photons produced by the wavelength shifter.

According to another aspect, a method includes producing first photons in response to received ionizing radiation, producing wavelength shifted photons in response to the first photons, reflecting at least one of first photons and wavelength shifted photons in a direction of the wavelength shifter, and generating an electrical signal indicative of the wavelength shifted photons.

According to another aspect, an apparatus includes a scintillator having a luminescence decay time less than about 20 to 25 ns, a photodetector, and a spectral matcher disposed optically between the scintillator and the photodetector. The spectral matcher reduces a spectral mismatch between photons produced by the scintillator and a spectral sensitivity of the photodetector.

Still further aspects of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 2:
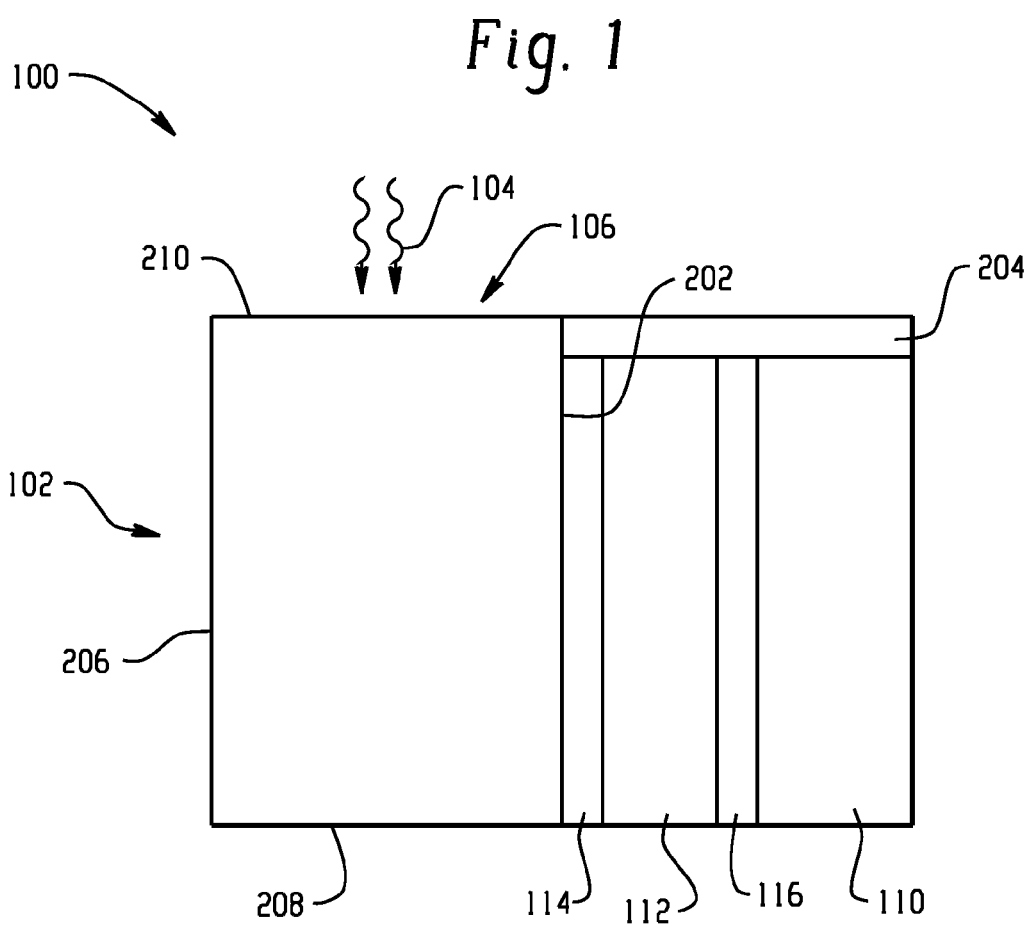
Figure 3:
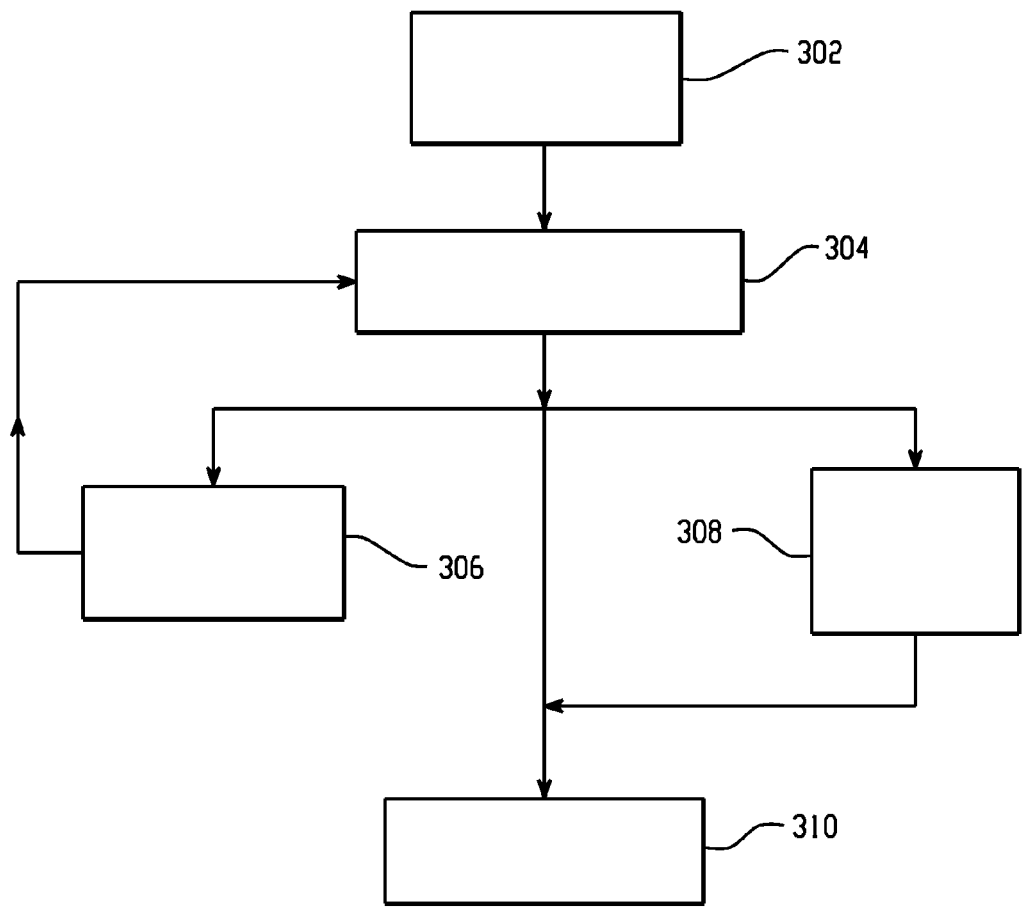
Figure 4:
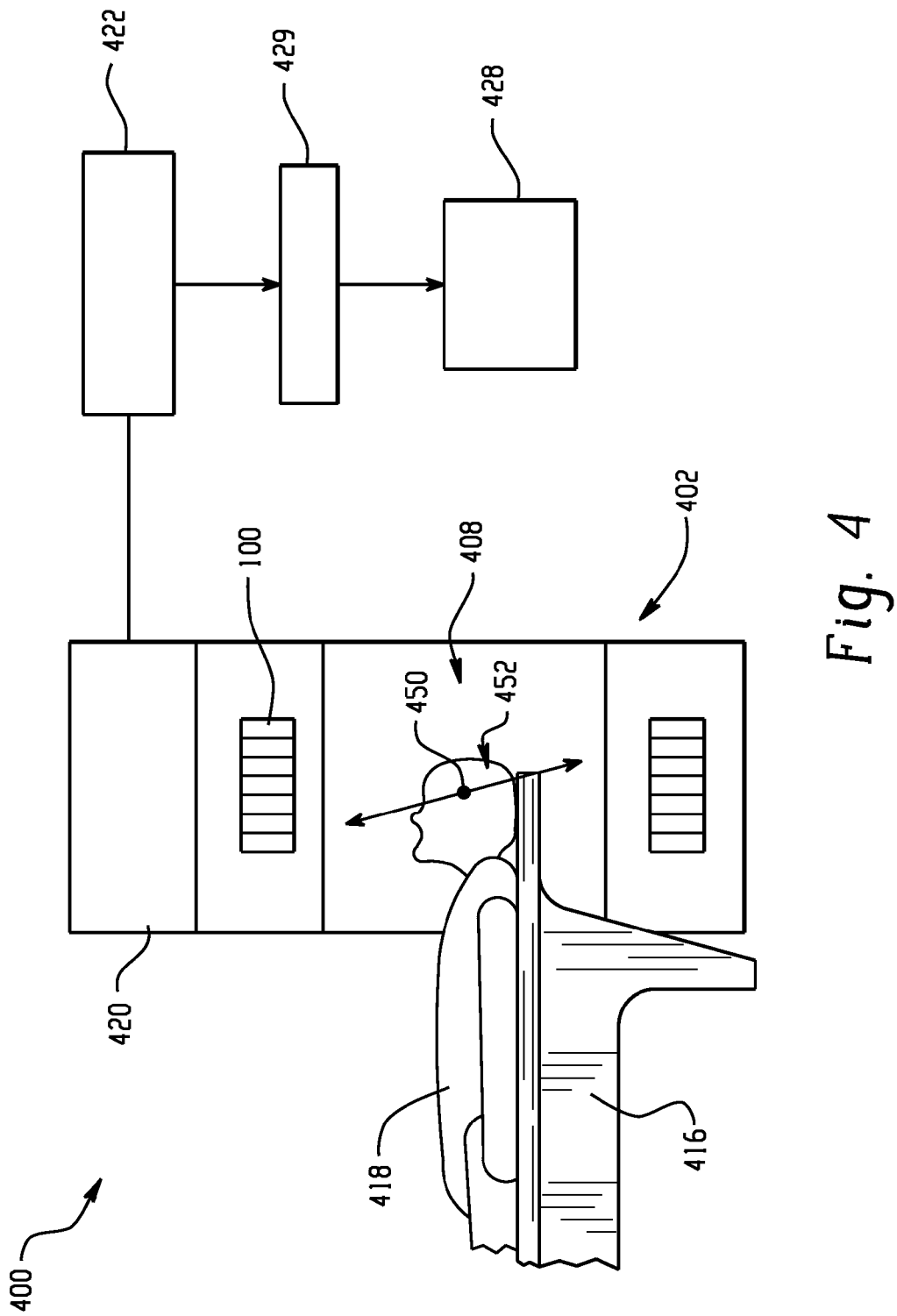

FIG. 1 is a cross-sectional view of a radiation detector.
FIG. 2 depicts a radiation detector.
FIG. 3 depicts a positron emission tomography apparatus.
FIG. 4 depicts an exemplary medical time of flight PET imaging system.

With reference to FIG. 1, a radiation detector 100 includes a scintillator 102 which generates scintillation photons in response to ionizing radiation 104 received at a radiation sensitive face 106 of the detector. The photons generated by the scintillator 102 have an energy which is lower than that of the radiation 104, with the photon emission spectrum and hence the spectral characteristics of the emitted photons being a function of the material selected for the scintillator 102. In many cases, relatively faster scintillator materials exhibit a peak photon emission in the ultraviolet (UV) or deep UV (DUV) portion of the spectrum, for example shorter than about 350 nanometers (nm).

A photodetector 110 such as one or more photomultiplier tubes (PMTs), photodiodes, or silicon photomultipliers (SiPMs) produces electrical signals indicative of photons received by the photodetector. In one implementation, the photodetector 100 has a maximum sensitivity at wavelengths which are generally longer than the photon emission spectrum of the scintillator, for example in the visible portion of the spectrum (i.e., between about 400 to 700 nm) and/or in the near infrared portion of the spectrum (i.e. at wavelengths up to about 1100 nm).

A wavelength shifter or down-converter 112 is disposed between the scintillator 104 and the photodetector 110. The wavelength shifter 112 receives the relatively shorter wavelength photons produced by the scintillator 104 and generates photons of a relatively longer wavelength for detection by the photodetector 110.

A first wavelength selective filter 114, which is disposed between the scintillator 102 and the wavelength shifter 112, allows photons of the wavelength generated by the scintillator 102 to pass through the first filter 114 to the wavelength shifter 112, while reflecting photons of the wavelength generated by the wavelength shifter 112 back toward the wavelength shifter 112. A second wavelength selective filter 116, which is disposed between the wavelength shifter 112 and the photodetector 110, allows photons of the wavelength generated by the wavelength shifter 112 to pass through the second filter 116 to the photodetector 110, while reflecting photons of the wavelength generated by the scintillator 102 back toward the wavelength shifter 112.

Suitable materials for and properties of the scintillator 102, photodetector 110, wavelength shifter 112, and filters 114, 116 may be selected based on application specific requirements such as the energy or energy range of the radiation 104 to be detected, the required detector 100 speed, performance, and cost, and the like. In one such example, a particular scintillator material 102 (or class of such materials) may be particularly well-suited for a given application due to its speed, luminous efficiency, stopping power, physical or mechanical properties, or other characteristics. As another example, a photodetector 110 may have speed, efficiency, or other characteristics which are well-suited to the application. Indeed, it may in some cases be desirable to optimize the design of a particular scintillator 102 or photodetector 110 or of a scintillator 102/photodetector 110 combination to meet the requirements of a particular application.

However, the correspondence between the photon emission spectrum of the scintillator 102 and the spectral sensitivity of an otherwise suitable photodetector 110 may be sub-optimal. Consequently, the wavelength shifter 112 may be configured to reduce the spectral mismatch. Similarly, the performance characteristics of the filters 114, 116 may be selected based on the spectral characteristics of the scintillator 102, wavelength shifter 112, and/or photodetector 110. While the filters 114, 116 may ordinarily be expected to more efficiently utilize the photons from the scintillator 102, one or both of the filters 114, 116 may also be omitted.

In one exemplary implementation which is suitable for use in high speed 511 keV gamma radiation detectors, the scintillator 102 includes a ceramic oxide or a halide which uses a lanthanide such as at least one of cerium (Ce), praseodymium (Pr), or neodymium (Nd) as the activating ion. The characteristic decay time of the d-f emission of Ce3+, Pr3+ and Nd3+ ions, for example, is between about 10 and 20 ns, when the peak photon emission is located in the deep ultraviolet (DUV) region: between about 200 to 300 nm. Hence, scintillators doped with these materials can ordinarily be expected to have a relatively fast luminescence decay time, for example less than about 20 to 25 ns. Such scintillators may also have an emission rise time of less than about less than about 1 ns and in some cases less than 500 picoseconds (ps).

The photodetector 110 has a maximum sensitivity in the visible portion of the electromagnetic spectrum and is relatively insensitive to the DUV photons produced by the scintillator 102.

The wavelength shifter 112 includes a ceramic thin film converter which converts the DUV photons emitted by the scintillator 104 to visible light. More specifically, the wavelength shifter includes an organic material such as organic dye molecules embedded in a porous ceramic material. While organic scintillators are ordinarily capable of relatively fast and efficient luminescence, they can be unstable when exposed to DUV radiation. Consequently, the organic material may be embedded in a ceramic or other inorganic layer which improves the stability of the conversion layer.

The inorganic layer may include zeolites or other porous materials in which the organic material is incorporated. Another example of suitable materials includes layered materials such as clay minerals in which the organic material is incorporated by intercalation.

The organic luminescence converter should have a decay time less than about 1 ns and preferably less than 500 ps for good timing characteristics in time of flight PET.

The detector and the converting layer can also be constructed such that the converting layer is removably attached to the detector and can be exchanged easily. This reduces the requirements with respect to photostability of the organic converters.

Moreover, the converting layer might also include an organic layer, which contains the organic luminescence converter.

The first 114 and second 116 filters may be implemented as interference filters. Such filters typically include multiple layers of dielectric material having different refractive indices (e.g., alternating layers of a relatively high and low refractive index), with the number and characteristics of the various layers being selected based on the desired filter characteristics and on the energy difference in photons generated by the scintillator and organic converter, respectively. In the present example, the first filter 114 would be configured to be relatively transmissive of DUV photons generated by the scintillator 102 while being generally reflective of visible photons generated by the wavelength shifter 112. Similarly, the second filter 116 would be configured to be relatively transmissive of visible photons while being generally reflective of DUV photons.

Variations are contemplated. For example, FIG. 1 depicts the various layers 102, 110, 112, 114, 116 as being generally planar with their major surfaces in optical communication. While the various layers are shown as having a uniform thickness for ease of illustration, the relative thicknesses of the various layers may vary. In one such example, the scintillator 102 might be expected to have a thickness relatively greater than that of the filters 114, 116 or the other layers.

Another exemplary detector 100 configuration is shown in FIG. 2. As illustrated, the filters 114, 116, wavelength shifter 112, and photodiode 110 are disposed to a first side 202 of the scintillator 102 which is substantially perpendicular to the receiving face 106 of the detector 100. A radiation shield 204 fabricated from a suitable material such as lead, tantalum, or the like shields the various components from the incident radiation 104. One or more of the second 206, third 208, fourth 210 and other sides of the scintillator may also be coated or otherwise covered with a material which is reflective of photons of the wavelengths emitted by the scintillator 102. The various components 112, 112, 116, 116, 110 may also be located on more or more of the various sides.

Note that also that the wavelength shifter 112 may be located relatively remotely from the scintillator 102 or that the photodetector 110 may be located relatively remotely from the wavelength shifter 112, with suitable light pipe(s) or other optically transmissive devices interposed therebetween.

The area of radiation receiving face 106 may also be selected based on application specific requirements, with the detector 100 structured accordingly. To improve spatial resolution, for example, the scintillator 102, filters 114, 116, and wavelength shifter 112 may be configured as a plurality of relatively smaller detector portions in optical communication with a close-packed or other array of relatively larger photodetectors 110.

In the case of a computed tomography (CT) or other x-ray detection application, a phosphor which emits for example in the green portion of the spectrum is in optical communication with photodiode(s) having a peak sensitivity in the infrared (IR). In such a case, the wavelength shifter 112 is configured to reduce the spectral mismatch therebetween.

Of course, the foregoing examples are non-limiting and other configurations, materials, and applications are contemplated.

Operation will now be described in relation to FIG. 3.

At 302, the scintillator 102 generates photons having an energy which is relatively lower than that of the radiation 104 received by the detector 100.

The wavelength shifter 112 generates wavelength shifted photons having a relatively longer wavelength than that of the scintillation photons.

Where the detector includes a second filter 116, at least some of scintillation photons which reach the second filter 116 are reflected back to the wavelength shifter 112 at step 306.

Where the detector includes a first filter 114, at least some of the wavelength shifted photons which reach the first filter 114 are reflected back toward the photodetector 110 at step 308.

At 310, the wavelength shifted photons are detected by the photodetector 110.

FIG. 4 depicts an exemplary medical time of flight PET imaging system 400 utilizing detectors 100 such as those described above. As illustrated, the PET system 400 includes a gantry 402 and a plurality of detectors 100 disposed in a generally cylindrical or ring-shaped arrangement about an examination region 408.

An object support 416 supports a human patient or other object to be imaged 418 in the examination region 408. The object support 416 is advantageously movable relative to the examination region 408 in coordination with operation of the PET system 100 so as to facilitate positioning of the object 418 and to allow scanning of the object 418 at a plurality of discrete or continuously moving axial locations as desired.

In a typical PET imaging examination, a suitable positron emitting tracer such as FDG is introduced into the anatomy of the patient 418. As the tracer decays, positrons are generated. A generated positron reacts with an electron in what is known as a positron annihilation event, thereby generating a coincident pair of 511 keV gamma rays which travel in substantially opposite directions along a line of coincidence 452.

A data acquisition system 420 generates information indicative of the various gamma photons detected by the detectors 100. Such data may include information such as the location at which a gamma photon was detected, the photon energy, the time at which the photon was received, and the like.

A coincidence/time of flight detector 422 receives the information from the data acquisition system 420 and to identify temporally coincident gamma photons indicative of positron annihilation events and measure the time of flight of the coincident photons, thus generating time of flight data for the various annihilation events.

A reconstructor 429 reconstructs the event data to generate image data indicative of the detected annihilations, for example using a suitable iterative or analytical reconstruction algorithm.

A workstation computer serves as an operator console 428 and includes human readable output devices such as a monitors or displays and input devices such as a keyboard and/or mouse. Software resident on the console 128 allows the operator to control the operation of the scanner 400 by establishing desired scan protocols, initiating and terminating scans, viewing and otherwise manipulating the image data, and otherwise interacting with the scanner 400.

While FIG. 4 has focused on a PET system, the system 400 may also include one or more additional imaging modalities, for example in a hybrid PET/CT, PET/MR, or other system. It will also be appreciated that FIG. 4 is a non-limiting example of one application for the detectors 100 and that other medical and non-medical applications which entail the detection of non-coincident radiation or radiation other than 511 keV gamma radiation are also contemplated. One such example is radioactive material detection systems, for example in the case of scanners used in security inspection applications.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus comprising:
   a scintillator which produces photons in response to received radiation;
   a wavelength shifter having a first major surface which receives photons from the scintillator, wherein the wavelength shifter produces photons having a relatively longer wavelength than the received photons;
   a first wavelength selective interference filter disposed between the scintillator and the wavelength shifter, wherein the first wavelength selective interference filter reflects at least a subset of the wavelength shifted photons back toward the wavelength shifter;
   a photodetector in optical communication with a second major surface of the wavelength shifter, wherein the photodetector produces an electrical signal indicative of the photons produced by the wavelength shifter.

2. The apparatus of claim 1 wherein the scintillator has a peak photon emission at a wavelength between about 200 to 350 nm.

3. The apparatus of claim 2 wherein the photodetector has a peak sensitivity between about 400 to 1100 nm.

4. The apparatus of claim 1 wherein the scintillator includes an activator selected from a group which includes neodymium and praseodymium.

5. The apparatus of claim 1 wherein the scintillator has a luminescence decay time less than about 25 ns.

6. The apparatus of claim 1 wherein the wavelength shifter includes an organic luminescent material.

7. The apparatus of claim 1 including a plurality of detectors disposed in a generally cylindrical arrangement about an examination region.

8. The apparatus of claim 1, further comprising a second different wavelength selective filter located between the wavelength shifter and the photodetector which reflects at least a subset of the photons produced by the scintillator back toward the wavelength shifter, wherein the wavelength shifter reduces a spectral mismatch between photons produced by the scintillator and a spectral sensitivity of the photodetector.

9. A method comprising:
producing, by a scintillator, first photons in response to received ionizing radiation;
producing, by a wavelength shifter located between the scintillator and a photodetector, wavelength shifted photons in response to the first photons;
reflecting, by a first wavelength selective filter located between scintillator and the wavelength shifter, at least one of the wavelength shifted photons back toward the wavelength shifter;
reflecting, by a second different wavelength selective filter located between the wavelength shifter and the photodetector, at least one of the first photons and wavelength shifted photons in a direction of the wavelength shifter;
reflecting, by a first wavelength selective filter at least one of the first photons in a direction of the wavelength shifter; and
generating an electrical signal indicative of the wavelength shifted photons.

10. The method of claim 9 wherein producing first photons includes producing photons in a deep ultraviolet portion of the spectrum and producing wavelength shifted photons includes producing photons in a visible portion of the spectrum.

11. The method of claim 9 wherein producing first photons includes producing photons in a visible portion of the spectrum and producing wavelength shifted photons includes producing photons in an infrared portion of the spectrum.

12. The method of claim 9 wherein reflecting includes using a wavelength selective interference filter to reflect produced wavelength shifted photons in a direction of a photodetector.

13. The method of claim 9 including measuring a time of flight of the received ionizing radiation.

14. The method of claim 9 wherein the received ionizing radiation includes radiation indicative of positron annihilations and the method includes using an iterative reconstruction algorithm to generate image data indicative of the positron annihilations.

15. The method of claim 9 wherein producing first photons includes using a lanthanide activated ceramic scintillator to produce scintillation photons.

16. The method of claim 9 including wherein producing wavelength shifted photons includes using a ceramic thin film converter to produce the wavelength shifted photons, wherein the ceramic thin film converter includes an organic dye.

17. An apparatus comprising:
a scintillator having a luminescence decay time less than about 20 to 25 ns;
a photodetector;
a spectral matcher, wherein the spectral matcher reduces a spectral mismatch between photons produced by the scintillator;
a first wavelength selective interference filter disposed between the scintillator and the spectral matcher, wherein the first wavelength selective interference filter reflects at least a subset of the wavelength shifted photons back toward the spectral matcher;
a photodetector in optical communication with a second major surface of the spectral matcher, wherein the photodetector produces an electrical signal indicative of the photons produced by the spectral matcher.

18. The method of claim 17 wherein the scintillator produces deep ultraviolet photons and the photodetector is sensitive to photons in the visible portion of the electromagnetic spectrum.

19. The apparatus of claim 17 wherein the scintillator is doped with praseodymium, neodymium, or cerium.

* * * * *